United States Patent [19]
Melzer

[11] 3,927,173
[45] Dec. 16, 1975

[54] TREATMENT OF ACID WASTE WATERS TO PRODUCE FERROMAGNETIC SLUDGES

[75] Inventor: Stephen F. Melzer, Fairfield, Ohio

[73] Assignee: Armco Steel Corporation, Middletown, Ohio

[22] Filed: Feb. 22, 1974

[21] Appl. No.: 445,315

[52] U.S. Cl. .............................. 423/142; 75/97 R
[51] Int. Cl.² ........................................ C01G 1/00
[58] Field of Search ............... 423/142, 144, 147; 75/.5 AA, .5 A, 97 R, 108

[56] References Cited
UNITED STATES PATENTS

| | | | |
|---|---|---|---|
| 1,287,939 | 12/1918 | Fireman | 423/147 |
| 2,433,458 | 12/1947 | Kahn et al. | 423/147 |
| 2,639,222 | 5/1953 | Tanski | 423/147 |
| 2,662,812 | 12/1953 | Shaw | 423/147 |
| 3,044,868 | 7/1962 | Francis | 75/.5 AA |
| 3,164,463 | 1/1965 | Graham et al. | 423/147 |

*Primary Examiner*—Walter R. Satterfield
*Attorney, Agent, or Firm*—Melville, Strasser, Foster & Hoffman

[57] ABSTRACT

Ferrous iron bearing acid waste waters such as hydrochloric acid waste waters or sulfuric acid waste waters or a combination of the two with or without a small amount of hydrofluoric acid, are treated with lime or sodium hydroxide and partially oxidized to produce hydrated ferroso-ferric oxide or hydrated magnetite. The process is conducted at ambient temperatures in a batch-type or a continuous operation.

26 Claims, 1 Drawing Figure

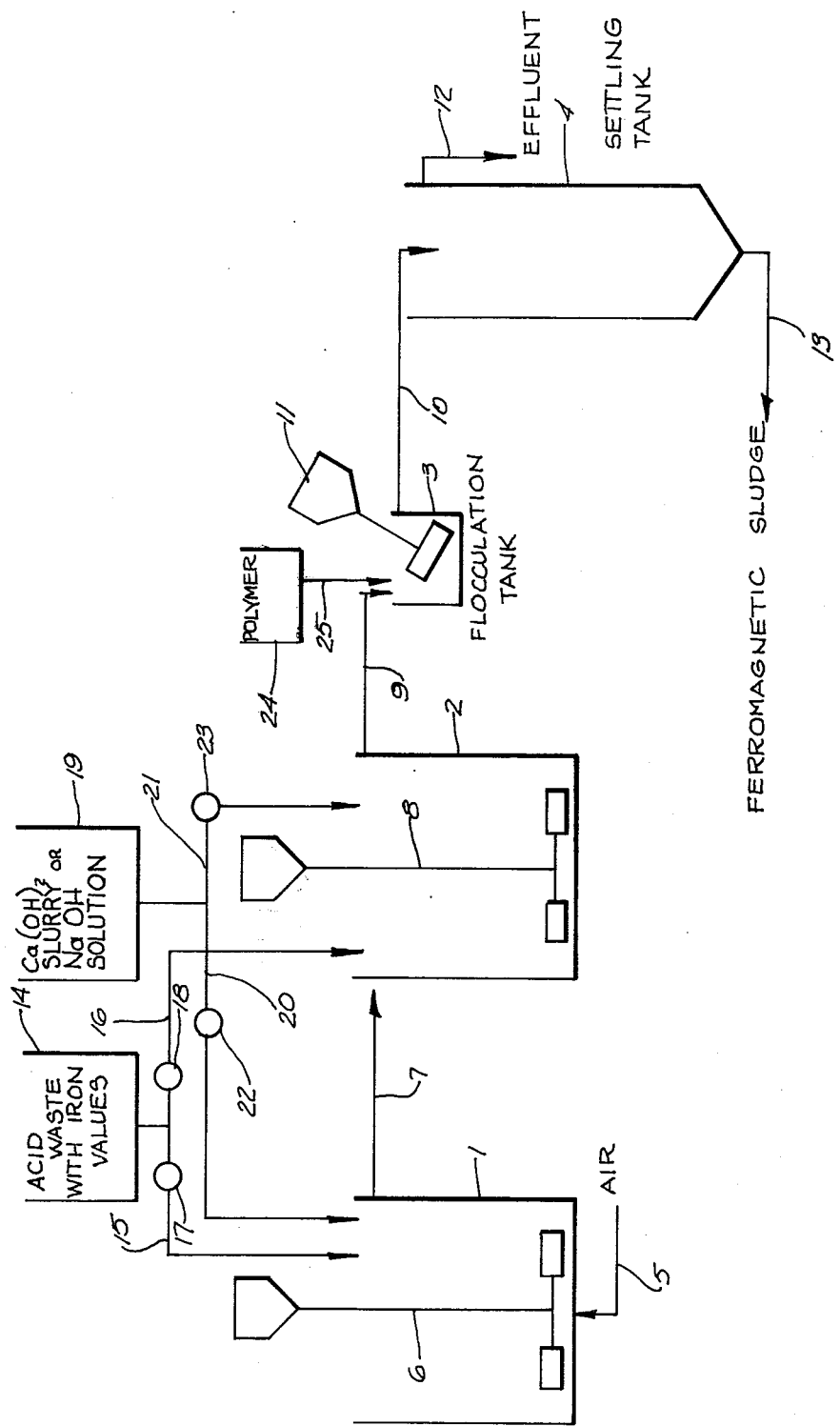

TREATMENT OF ACID WASTE WATERS TO PRODUCE FERROMAGNETIC SLUDGES

BACKGROUND OF THE INVENTION

1. Field of the Invention

The invention relates to a process for converting at ambient temperatures the iron values contained in acid waste waters such as hydrochloric acid waste waters or sulfuric acid waste waters, or a combination of both, into a precipitate of hydrated ferroso-ferric oxide (hydrated magnetite).

2. Description of the Prior Art

Annually, great quantities of acid waste waters containing iron values are produced as a result, for example, of the steel making process. While much attention has been given to the processing of such waste waters, the most common practice involves simple neutralization with the formation of useless ferrous or ferric hydroxide sludges which must be permanently stored on sludge piles or in lagoons. Such sludges remain gelatinous for many years, never attaining the ability to bear a load, and thus are unsuitable for land fill purposes or the like.

Prior art workers have frequently used waste pickling acids in processes for producing magnetite. U.S. Pat. Nos. 961,794 2,374,454 and 2,419,240 are exemplary. These processes contemplate the use of ammonia and frequently require severe and often critical conditions including elevated temperatures, long reaction times and the like. U.S. Pat. No. 2,529,874 teaches a process of obtaining magnetite involving the use of ammonia and elevated temperature. Ammonia is also used in U.S. Pat. No. 3,451,769 together with nitric oxide as a catalyst. Again, high temperatures are involved.

Other prior art workers have used lime instead of ammonia for neutralization and precipitation. U.S. Pat. Nos. 3,261,665, 3,375,066 and 3,434,797 are exemplary. Here again, elevated temperatures and long reaction times are required.

The present invention is directed to the treatment of ferrous iron bearing acid waste waters such as hydrochloric or sulfuric acid spent pickling liquors, rinse waters, and the like. The iron values of the waste waters are converted to hydrated ferroso-ferric oxide or hydrated magnetite. The hydrated magnetite sludge is more dense and takes up about one-half to one-third the volume of the typical ferrous hydroxide and/or ferric hydroxide sludge achieved by simple neutralization. The process of the present invention may be conducted either as a batch-type operation or as a continuous operation. The process is uncomplicated, needs no catalyst, requires a minimum of external controls and is applicable to a wide variety of acid wastes containing a wide range of iron value concentrations, although certain minimum concentrations are necessary as will be described hereinafter. It has further been found that the presence of small amounts of hydrofluoric acid will not interfere with the process.

In addition to the obvious advantages of the process of the present invention with regard to ecological and storage considerations, numerous economic advantages obtain as well. A waste acid water treatment plant employing the process of the present invention may have its capacity at least doubled. The slude produced is not gelatinous and should be suitable for landfill. Furthermore, the magnetite precipitate formed may be dried and processed for recycling as sinter feed or high grade magnetic iron powder.

Since the process of the present invention is conducted at ambient temperatures, there is no need for the use of steam or other heat generating means. Since both sodium hydroxide [NaOH] or lime [Ca(OH)$_2$] are stronger bases than ammonia, less sodium hydroxide or lime is needed. Furthermore, lime is less expensive than ammonia. As a consequence of these factors, the process of the present invention requires a lower overall cost of operation.

SUMMARY OF THE INVENTION

Acid waste waters containing iron values, such as hydrochloric, hydrochloric-hydrofluoric, sulfuric, sulfuric-hydrofluoric, hydrochloric-sulfuric or hydrochloric-sulfuric-hydrofluoric waste waters, are treated with sodium hydroxide or lime to produce a dense ferromagnetic sludge. The sludge comprises a hydrated ferroso-ferric oxide or hydrated magnetite. During the process, the iron values are partially oxidized through the introduction of air, as will be described hereinafter.

The process may be conducted as a batch-type operation, or it may be performed as a continuous operation. The process is conducted at ambient temperatures. The resultant ferromagnetic sludge may be stored by lagooning or the like, as is well known in the art. Alternatively, the magnetite or magnetite-bearing sludges may be dried and processed to recover the iron values therefrom for use as sinter feed, magnetic iron powders, etc.

BRIEF DESCRIPTION OF THE DRAWING

The FIGURE is a diagrammatic representation of the process of the present invention in its embodiment as a continuous process.

DESCRIPTION OF THE PREFERRED EMBODIMENTS

The present invention contemplates the treatment of iron containing acid waste waters such as hydrochloric acid waste waters or sulfuric acid waste waters with sodium hydroxide or lime to produce a dense ferromagnetic sludge comprising a hydrated ferroso-ferric oxide (hydrated magnetite). The basic reactions are believed to occur as stated below.

When a hydrochloric acid waste water containing iron values is treated with high-calcium lime and subjected to partial oxidation:

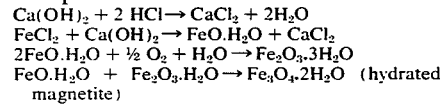

When a hydrochloric acid waste water containing iron values is treated with sodium hydroxide and subjected to partial oxidation:

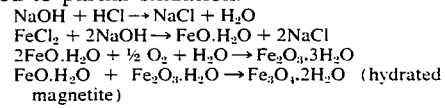

When a sulfuric acid waste water containing iron values is treated with high-calcium lime and subjected to partial oxidation:

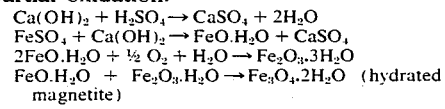

When a sulfuric acid waste water containing iron values is treated with sodium hydroxide and subjected to partial oxidation:

$$2NaOH + H_2SO_4 \rightarrow Na_2SO_4 + 2H_2O$$
$$FeSO_4 + 2NaOH \rightarrow FeO \cdot H_2O + Na_2SO_4$$
$$2FeO \cdot H_2O + \tfrac{1}{2} O_2 + H_2O \rightarrow Fe_2O_3 \cdot 3H_2O$$
$$FeO \cdot H_2O + Fe_2O_3 \cdot H_2O \rightarrow Fe_3O_4 \cdot 2H_2O \text{ (hydrated magnetite)}$$

As noted above, the presence of small amounts of hydrofluoric acid, sometimes used in conjunction with hydrochloric or sulfuric acid, does not interfere with the process of the present invention. The basic reactions may be stated as follows:

$$Ca(OH)_2 + 2HF \rightarrow CaF_2 + 2H_2O$$
$$NaOH + HF \rightarrow NaF + H_2O$$

As indicated above, the process of the present invention may be carried out as a batch-type operation or in a continuous manner. Exemplary embodiments of the invention will first be described in terms of batch-type operations.

The process is carried out in a vessel of appropriate size, depending upon the volume of acid waste to be treated. The vessel is provided with suitable mixing or stirring means as is well known in the art. Finally, the vessel should have inlet means for air to enable the partial oxidation of the acid waste.

In a typical application, hydrochloric acid spent pickling liquor having iron values or sulfuric acid spent pickling liquor having iron values is placed in the vessel. Sodium hydroxide solution is added to the acid waste to precipitate the iron therefrom and to achieve a desired pH. The material in the vessel is mixed or stirred and air is introduced into the contents of the vessel to partially oxidize the iron. During the reaction, the pH will vary and sodium hydroxide solution is added to maintain the desired pH to insure complete conversion to hydrated magnetite. As a result of the reactions taking place in the vessel, a dense, black, ferromagnetic precipitate or sludge is formed.

Similarly hydrochloric acid and sulfuric acid wastes may be treated with a lime slurry. Again, the lime slurry is added in such an amount as to achieve and to maintain a desired pH. Under these circumstances, however, aeration should be stopped after about two-thirds of the iron is oxidized. If aeration continues, a non-magnetic ferric hydroxide sludge is formed. When the partial oxidation described above is practiced, a ferro magnetic sludge is again formed, comprising hydrated magnetite.

In a batch-type treatment of hydrochloric acid spent pickling liquor or sulfuric acid spent pickling liquor with sodium hydroxide solution or lime slurry, it has been determined that the pH desired to be initially achieved and maintained throughout the process falls within a range determined by a number of factors. The low end of the range may be defined as that pH value at which precipitation of ferrous iron will be substantially complete. The upper limit of pH range is set by economic factors and a consideration of the final pH of the liquid effluent and the water quality of the effluent. Excellent results have been achieved with a pH range of from about 8 to about 9 and preferably from about 8 to about 8.5.

In the batch-type process of the present invention, about two-thirds oxidation of the iron values is preferred. If less than about two-thirds of the iron values are oxidized, iron values will be present in the effluent. If more than about two-thirds of the iron values are oxidized, the quality of the magnetic sludge is impaired.

In the treatment of hydrochloric and/or sulfuric acid waste waters with a sodium hydroxide solution or a lime slurry the minimum iron concentration of the acid waste water required for successful practice of the process is limited only by ease of control of the iron value oxidation step of the process. The maximum iron concentration required for the practice of the batch-type process is determined only by the physical limitation of the ease of stirring and aeration for the oxidation of the iron values. In the treatment of hydrochloric acid waste waters or sulfuric acid waste waters with a sodium hydroxide solution or a lime slurry it has been determined, for example, that adequate aeration and mixing becomes difficult if the iron concentration of the waste water exceeds about 25,000 mg/liter. In the treatment of hydrochloric acid waste waters (or hydrochloric-hydrofluoric acid waste waters) with a sodium hydroxide solution it has further been determined that if the iron concentration of the waste water is maintained within a range of from about 1,750 mg/liter to about 25,000 mg/liter, the oxidation of the iron values stops when about two-thirds of the iron values have been oxidized. Thus, under these circumstances, the oxidation reaction is self-controlling. Workable iron value concentrations may be readily ascertained by one skilled in the art depending upon the equipment being used, the nature of the waste water being treated and like factors.

From the above it will be evident that the desired ferromagnetic sludge can be produced with minimal control when treating hydrochloric acid waste waters with sodium hydroxide as the neutralizing agent. In a small waste hydrochloric acid treatment facility where the cost of the neutralizing agent is not significant, this procedure is recommended. However, when treating sulfuric acid waste waters or in a larger waste acid treatment facility where the use of lime would be highly desirable for economic reasons, some sort of control would be necessary to achieve the desired partial oxidation of the iron so as to result in the conversion of the iron values to hydrated magnetite. This may be accomplished either by analytically monitoring the ferrous iron concentration during aeration, or by the use of a different equipment configuration as described below.

An exemplary and simple method of control involves the provision of two vessels. The hydrochloric acid waste or sulfuric acid waste is divided between a first vessel and a second vessel in the ratio of from about 2:1 to about 1:1. The material in the first vessel is aerated to completely oxidize the iron values. Slurried lime or sodium hydroxide solution is added to the first vessel to achieve and maintain a pH such that, with complete oxidation of the iron values, substantially complete conversion to ferric hydroxide is achieved. While a pH of about 7 is sufficient, oxidation proceeds more quickly at higher pH values. Further, a higher pH is desirable so that when the contents of the two vessels are subsequently combined, a pH of from about 9 to about 9.5 results. Excellent results are achieved at a pH of from about 11 to about 12 and preferably from about 11.5 to about 12.

The same neutralizing agent used in the first vessel is added to the contents of the second vessel to maintain a pH of from about 9 to about 9.5. At pH values below about 9 ferrous iron will remain in solution. While not binding, the value of 9.5 for the upper end of the pH range has been selected on the basis of economics and the pH and water quality of the effluent from the process which is normally to be disposed of. Ferrous hydroxide is formed in the second vessel.

Thereafter, the contents of the two vessels are combined and the two precipitates are mixed. It has been found that in a hydrochloric acid matrix, the hydrated magnetite is formed when the combined material is mixed and permitted to stand for about one hour. In a sulfuric acid matrix, a similar ferromagnetic sludge is formed when the combined sludges are mixed and permitted to stand for several hours. This two vessel batch process should be conducted in such a way that for a given concentration of iron values in the acid waste waters about two-thirds of the total iron values of the combined vessel contents are oxidized.

It will be understood by one skilled in the art that in any of the batch-type operations described above the settling and standing of the reacted materials need not take place in the reaction tank or tanks. One or more additional settling tanks may be provided for this purpose, freeing the reaction tanks for the receipt of a new batch of reactants. As used here and hereinafter the term "settling tank" is intended to include clarifiers or thickeners as are well known in the art.

Where the volume of waste waters to be processed merits it, it may be desirable to practice the process of the present invention as a continuous process. The FIGURE diagrammatically illustrates an exemplary embodiment of the process of the present invention as a continuous operation. Basically, the embodiment comprises a first tank 1, a second tank 2, a flocculation tank 3 and a settling tank 4.

Tank 1 is provided with inlet means 5 for air. A stirring or mixing device 6 is also provided. The mixing device may be of any appropriate type known in the art. The tank 1 is connected by conduit 7 to tank 2. Tank 2 is also provided with a similar stirring or mixing means 8.

Tank 2 is connected by conduit 9 to flocculation tank 3. In similar manner, flocculation tank 3 is connected by conduit 10 to the settling tank 4. The flocculation tank may be provided with an appropriate stirring or mixing means 11. The settling tank has an outlet 12 for the effluent therefrom. At its bottom, the settling tank is provided with a conduit or discharge means 13 for the ferromagnetic sludge formed as a result of the process.

A source of acid waste water containing iron values is diagrammatically indicated at 14. This source is connected by conduits 15 and 16 to tanks 1 and 2, respectively. Conduits 15 and 16 are shown provided with metering pumps 17 and 18, respectively. Such pumps are optional, however, since the feed could also be by gravity controlled with valves or by other means well known in the art.

A source of lime slurry or sodium hydroxide solution is diagrammatically indicated at 19 and is connected by lines 20 and 21 to tanks 1 and 2. Lines 20 and 21 are similarly provided with metering pumps 22 and 23 respectively. As in the case of conduits 15 and 16, metering pumps 22 and 23 are also optional, other feed systems being appropriate for this purpose.

In the practice of the continuous process, the hydrochloric acid waste or sulfuric acid waste is constantly added to tanks 1 and 2 in a ratio of from about 2:1 to about 1:1.

Air is added via conduit 5 to the contents of tank 1. The agitator or stirrer 6 ensures the efficient aeration and complete oxidation of the iron values in tank 1.

Lime slurry or sodium hydroxide solution is added from source 19 to tank 1 via conduit 20 and metering pump 22. The neutralizing agent is added to tank 1 in an amount sufficient to achieve and maintain a pH in tank 1 such that, with complete oxidation of the iron values, substantially complete conversion to ferric hydroxide is achieved. The lower pH values limit is determined by the neutralizing agent used. There is no real upper limit for the pH value in tank 1 based upon the reactions taking place therein. Excellent results are achieved at a pH of from about 11 to about 12 with best results at a pH of about 11.5 when neutralizing with dolomitic lime. A pH as low as 8.5 may be used when neutralizing with high-calcium lime.

The same neutralizing agent is added to the second tank via conduit 21 and metering pump 23 in an amount sufficient to achieve and maintain a pH of from about 9 to about 9.5. As in the case of the two-vessel batch process, it has been found that a pH value of less than about 9 will result in ferrous iron remaining in solution. Again, the upper value of 9.5 for the pH is not binding, but has been selected for reasons of economics and the pH and water quality of the effluent. In the practice of the present invention, the pH and water quality of the effluent may be a factor of significance, particularly if the effluent is to be discharged to water ways.

The material from tank 1 including the ferric hydroxide precipitate formed therein is carried via conduit 7 to tank 2. In tank 2, a ferrous hydroxide precipitate is formed. The combined contents from tanks 1 and 2 may then be conducted from tank 2 to a settling tank such as settling tank 4.

Some iron will oxidize in tank 2 by virtue of atmospheric oxidation. The acid waste waters should be so divided between tanks 1 and 2 that after complete oxidation of the iron values in the waste waters of tank 1 and the addition of these waste waters to the waste waters of tank 2, about two-thirds of the iron values in the total waste waters of tank 2 will be oxidized. To achieve this, and depending upon the waste waters being treated, the iron concentration thereof and like factors, about two-thirds or less of the waste waters (by volume) will be introduced into tank 1.

The only upper limit on the permissible iron concentration of the hydrochloric acid or sulfuric acid waste waters treated in the continuous process of the present invention is the physical limitation of the ease of stirring and aeration for the oxidation of the iron values. In those cases where the volume of waste waters to be treated is high enough to make the continuous approach desirable, it is unlikely that the iron concentration would be so high as to require dilution. Nevertheless, such dilution could be practiced within the scope of this invention should the need arise.

In both batch and continuous type operations the upper limit of iron concentration which can be treated is difficult to define precisely, the ability of the equipment chosen to provide aeration and mixing being the only limitations thus far experienced. This limit appears to be about 25,000 mg/liter for any matrix and any neutralizing agent. The development of more efficient equipment could raise this limit. In the treatment of hydrochloric acid waste waters with lime, it has been found desirable to have an iron concentration of at least 500 mg/liter so that the hydrated magnetite will be found in tank 2. Lower iron value concentrations may be used if contents of tank 2 are protected from the atmosphere, or if an appropriate holding time can be accommodated in the process to permit formation of the desired ferromagnetic sludge in the settling tank. In the treatment of sulfuric acid waste waters with a lime slurry, a minimum iron concentration of about 2,700 mg/liter is desired to form the hydrated magnetite in tank 2. Again, if the contents of tank 2 are protected from the atmosphere or if a holding time can be tolerated in the process for the formation of the ferromagnetic sludge in the settling tank, lower concentrations may be employed.

In the exemplary embodiment shown, an optional flocculation tank 3 is illustrated between tank 2 and settling tank 4. An organic polymer flocculating aid may be introduced from a source diagrammatically indicated at 24 via conduit 25 into the contents of flocculation tank 3. The use of flocculation tank 3 is desirable when it is necessary or desired to achieve a quick liquid-solid separation to produce an effluent from settling tank 4 free of suspended solids. An exemplary polymer suitable for this purpose is a derivative of polyacrylamide. Other expedients well known in the art may be used for this purpose including a motionless mixer or the like. If the sludge is magnetic at this point, the possibility of flocculating magnetically also exists.

Within the parameters given above, the acid waste waters and the lime slurry or sodium hydroxide solution may be continuously added to tanks 1 and 2. Material from tank 2 may be continuously drawn off and introduced into flocculation tank 3 when used. Material from flocculation tank 3 (or directly from tank 2 when flocculation is not required) may be introduced into settling tank 4. Effluent from settling tank 4 is continuously drawn off via conduit 12 and may be discharged to an appropriate waterway or otherwise disposed of. The ferromagnetic sludge of the present process is removed continuously or intermittently via conduit 13 from settling tank 4. The sludge may be lagooned or filtered, dried and further processed for any of the purposes given above.

An advantage of the processes of the present invention is the fact that they may be practiced at ambient temperatures. The term "ambient temperatures" is intended to refer to temperatures of from about 70° to about 80°F. It will be understood by one skilled in the art that temperatures above about 80°F will only help the process. The important feature of the invention is that it may be practiced at temperatures as low as about 70°F. In the continuous embodiment of the process of the present invention the hydrated magnetite may not be formed in tank 2 if the process is conducted at a temperature below about 70°F. If, in a given installation, a holding time in the settling tank is permissible to enable the formation of the hydrated magnetite, the process may be practiced below about 70°F. If, for one reason or another, such a holding time is not deemed desirable, steps may be taken to conduct the continuous process at a temperature of at least about 70°F.

The same is true of the process of the present invention practiced as a batch-type process. At temperatures below about 70°F, longer holding times may be required in the vessel or in the second vessel of a two-vessel batch-type operation. Such holding times could be achieved in settling tanks if desired.

The iron present in the form of hydrated magnetite occupies from about one-half to about one-third the volume normally occupied by an equivalent amount of ferric or ferrous hydroxide sludge. This increase in density is not so apparent when formed from a sulfuric acid matrix since a major portion of this sludge consists of calcium sulfate (gypsum). Nevertheless, assuming that a greater part of the sludge is gypsum and that the gypsum does not change in volume, a 20% to 40% reduction in sludge volume can still be expected in the practice of the process of the present invention. While not wishing to be bound by theory, it is believed that the presence of gypsum in the sludge inhibits the necessary contact of the ferric hydroxide and ferrous hydroxide precipitates for the formation of the ferromagnetic sludge of the present invention, thus accounting for the greater minimum concentration of iron required in the treatment of sulfuric acid wastes.

The following are examples of the practice of the present invention.

EXAMPLE I

In a batch-type process 500 ml of spent hydrochloric pickling acid containing 5 g ferrous iron per liter was treated with high-calcium lime to pH 9.5. One liter of the same acid waste was also treated with high-calcium lime to give pH 8.5; this portion was aerated to completely oxidize the iron. The two portions were combined, mixed and allowed to stand overnight ($Fe^{+3}/Fe^{+2} = 2/1$). Hydrated magnetite was formed which had a volume of 210 ml or 28 ml/g iron.

When 1.5 liters of the same acid waste was treated with high-calcium lime to pH 8.5 and aerated to completely oxidize the iron, the final volume after standing overnight ($Fe^{+3}/Fe^{+2} = 1/0$) was 525 ml or 70 ml/g iron; no magnetite was formed.

When 1.5 liters of the same acid waste was treated with high-calcium lime to pH 9.5 and allowed to stand overnight ($Fe^{+3}/Fe^{+2} = 0/1$), the final volume was 375 ml or 50 ml/g iron; no magnetite was formed.

EXAMPLE II

In a batch-type process 500 ml of spent sulfuric pickling acid containing 5 g ferrous iron per liter and 19 g total sulfuric acid per liter was treated with high-calcium lime to pH 9.5. One liter of the same acid waste and also treated with high-calcium lime to pH 8.5; this portion was aerated to completely oxidize the iron. The two portions were combined, mixed and allowed to stand overnight ($Fe^{+3}/Fe^{+2} = 2/1$). Hydrated magnetite was formed which had a volume of 525 ml or 70 ml/g iron.

For 1.5 liters of treated acid in which $Fe^{+3}/Fe^{+2} = 1/0$, the final sludge volume was 750 ml or 100 ml/g iron; no magnetite was formed.

For 1.5 liters of treated acid in which $Fe^{+3}/Fe^{+2} = 0/1$, the final sludge volume was 675 ml or 90 ml/g iron; no magnetite was formed.

Examples I and II show that by following the teachings of the present invention a hydrated magnetite will be formed characterized by considerably less sludge volume. The use of sodium hydroxide instead of lime is recommended when treating a spent sulfuric pickling acid; less sludge volume would result since no gypsum is formed.

EXAMPLE III

In a continuous-type process apparatus essentially similar to that shown in the figure was assembled to accommodate a flow rate of two liters per minute of a hydrochloric acid waste containing 1,000 mg/liter of ferrous iron. The waste was metered to tanks 1 and 2 such that the ratio of $Fe^{+3}$ to $Fe^{+2}$ in the effluent from tank 2 was 8:5. A slurry of dolomitic lime was added to tank 1 to maintain a pH value of 11.5; tank 1 was aerated to completely oxidize the iron. A slurry of dolomitic lime was also added to tank 2 to maintain a pH value of 9. The contents from tank 1 which now contained ferric hydroxide continuously flowed to tank 2 where ferrous hydroxide was being formed. In tank 2 the ferric and ferrous hydroxides combined to form hydrated magnetite. A sample of the effluent from tank 2 had a final sludge volume of 100 ml or 50 ml/g iron after standing overnight.

EXAMPLE IV

A continuous-type process similar to that of Example III was practiced using high-calcium lime instead of dolomitic lime and maintaining the pH value in tank 1 at 8.5 instead of 11.5. This process resulted in the formation of hydrated magnetite which had a sludge volume of 60 ml or 30 ml/g iron after standing overnight.

Modifications may be made in the invention without departing from the spirit of it. While best results are obtained in the practice of the present invention through the use of sodium hydroxide or high-calcium lime (i.e. lime low in magnesia), the term "lime" as used herein is intended to include dolomitic lime having a variable content of magnesia. Other alkaline neutralizing agents may be used. Some such agents, as for example potassium hydroxide, would be clearly uneconomical except under very unusual circumstances.

It would be within the scope of the invention to add a third tank to the embodiment shown in the FIGURE. Under these circumstances, instead of continuously transferring the contents of tank 1 to tank 2, the contents of both tanks 1 and 2 would be transferred to the third tank and mixed therein. The contents of the third tank would be transferred either directly to settling tank 4 or to flocculation tank 3 if used.

The embodiments of the invention in which an exclusive property or privilege is claimed are defined as follows:

1. A process of treating at ambient temperature acid waste water containing iron values, said waste water being chosen from the class consisting of hydrochloric acid waste waters, hydrochloric-hydrofluoric acid waste waters, sulfuric acid waste waters, sulfuric-hydrofluoric acid waste waters, hydrochloric-sulfuric acid waste waters and hydrochloric-sulfuric-hydrofluoric acid waste waters to produce hydrated magnetite, said process comprising the steps of adding to said waste water a neutralizing agent to achieve and maintain a final pH of the waste water of at least about 8 such that precipitation of the iron values will be substantially complete, aerating said waste, stopping said aeration when about two-thirds of the total of said iron values are oxidized, stirring said waste water at least during said aeration step.

2. The process claimed in claim 1 wherein said neutralizing agent is chosen from the class consisting of sodium hydroxide and lime.

3. The process claimed in claim 1 conducted as a batch-type operation in a single vessel.

4. The process claimed in claim 1 conducted as a batch-type operation and including the steps of providing first and second vessels, providing both said vessels with stirring means, providing said first vessel with inlet means for air, dividing said waste water between said first and second vessels in a ratio of from about 2:1 to about 1:1, stirring said waste water in said first vessel and adding air thereto to completely oxidize said iron values therein, adding said neutralizing agent to said first vessel to achieve and maintain a pH of from about 7 to about 12 such that with complete oxidation of said iron values in said first vessel substantially complete conversion thereof to ferric hydroxide precipitate is achieved, stirring said waste water in said second vessel, adding said neutralizing agent to said waste water in said second vessel to achieve and maintain a pH of at least about 9 such that the iron values in said second vessel are substantially completely converted to ferrous hydroxide precipitate, so combining and mixing the contents of said first and second vessels as to provide a mixture wherein about two-thirds of the iron values therein are oxidized and wherein the pH is within the range of about 9 to about 9.5, and holding said mixed contents until the formation of said hydrated magnetite.

5. The process claimed in claim 1 conducted as a continuous operation and including the steps of providing a first vessel and stirring means and an air inlet therefor, providing a second vessel and stirring means therefor, providing a settling tank, constantly adding said acid waste water to said first and second vessels in a ratio of from about 2:1 to about 1:1, stirring and adding air to said waste water in said first vessel to completely oxidize the iron values therein, adding said neutralizing agent to said first vessel in an amount to achieve and maintain a pH of from about 8.5 to about 12 such that with complete oxidation of said iron values therein substantially complete conversion thereof to ferric hydroxide precipitate is achieved, stirring said waste water in said second vessel and adding said neutralizing agent to said second vessel to achieve and maintain a pH of at least about 9 such that the iron values in said second vessel are substantially completely converted to ferrous hydroxide precipitate, continuously conveying material from said first vessel including the said ferric hydroxide precipitate to said second vessel such that about two-thirds of the iron values in the total waste water of said second vessel are oxidized, and continuously conveying the combined contents of said second vessel to said settling tank.

6. The process claimed in claim 1 wherein said ambient temperature is at least 70°F.

7. The process claimed in claim 2 wherein said lime is high-calcium lime.

8. The process claimed in claim 2 wherein said lime is dolomitic lime.

9. The process claimed in claim 3 wherein said pH is maintained within the range of from about 8 to about 9.

10. The process claimed in claim 3 wherein said pH is maintained within the range of from about 8 to about 8.5.

11. The process claimed in claim 3 wherein the concentration of said iron values in said waste water is up to about 25,000 mg/liter.

12. The process claimed in claim 3 wherein said waste water is chosen from the class consisting of hydrochloric acid waste waters and hydrochloric-hydrofluoric waste waters, wherein said neutralizing agent comprises sodium hydroxide and wherein said iron values in said waste water having a concentration of from about 1,750 mg/liter to about 25,000 mg/liter whereby said process is self-controlling in that said oxidation reaction automatically stops when about two-thirds of said iron values have been oxidized.

13. The process claimed in claim 3 including the steps of providing a settling tank and conducting the treated contents of said vessel to said settling tank.

14. The process claimed in claim 4 wherein said pH in said first vessel is maintained in a range of from about 11 to about 12 and said pH in said second vessel is maintained at at least about 9.

15. The process claimed in claim 4 wherein said pH in said first vessel is maintained in a range of from about 11.5 to about 12 and said pH in said second vessel is maintained in a range of from about 9 to about 9.5.

16. The process claimed in claim 4 wherein the concentration of said iron values in said waste water is up to about 25,000 mg/liter.

17. The process claimed in claim 4 including the steps of providing a settling tank and holding said mixed contents of said first and second vessels in said settling tank.

18. The process claimed in claim 5 wherein the concentration of said iron values in said waste water is up to about 25,000 mg/liter.

19. The process claimed in claim 5 wherein said neutralizing agent is dolomitic lime and said pH in said first vessel is in the range of from about 11 to about 12.

20. The process claimed in claim 5 wherein said neutralizing agent is dolomitic lime and said pH in said first vessel is in the range of from about 11.5 to about 12.

21. The process claimed in claim 5 wherein said neutralizing agent is high-calcium lime and said pH in said first vessel is at least about 8.5.

22. The process claimed in claim 5 including the step of so dividing said waste water between said first and second vessels that after complete oxidation of said iron values in said first vessel and the addition of waste water from said first vessel to said second vessel about two-thirds of the iron values in the total waste water of said second vessel are oxidized.

23. The process claimed in claim 5 wherein said waste water is chosen from the class consisting of hydrochloric acid and hydrochloric-hydrofluoric acid waste waters, said neutralizing agent being lime and said iron value concentration of said waste water being at least about 500 mg/liter.

24. The process claimed in claim 5 wherein said waste water is chosen from the class consisting of sulfuric acid and sulfuric-hydrofluoric acid waste waters, said neutralizing agent being lime and said waste water having an iron value concentration of at least about 2700 mg/liter.

25. The process claimed in claim 5 including the step of treating said combined contents of said second vessel with a flocculating aid in a flocculation tank ahead of said settling tank.

26. The process claimed in claim 5 including the step of removing said hydrated magnetite from said settling tank for further processing.

* * * * *